Oct. 11, 1966

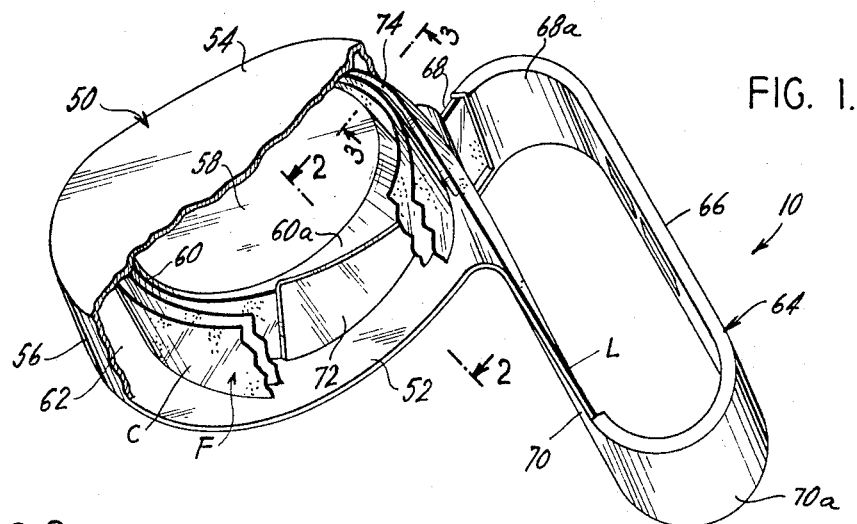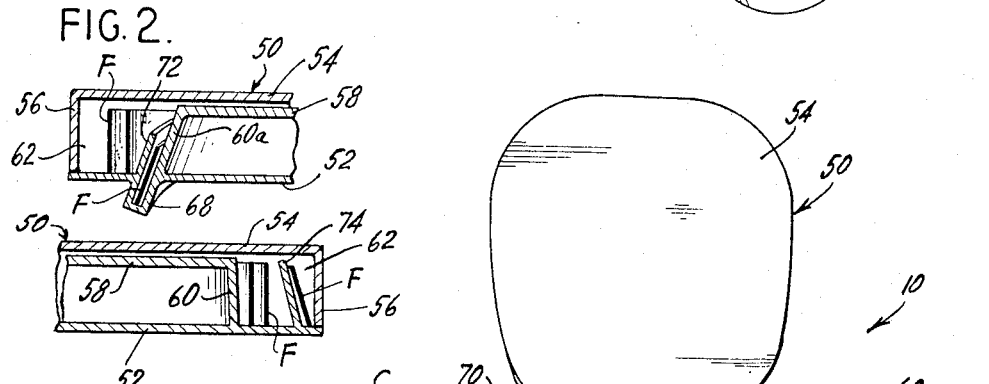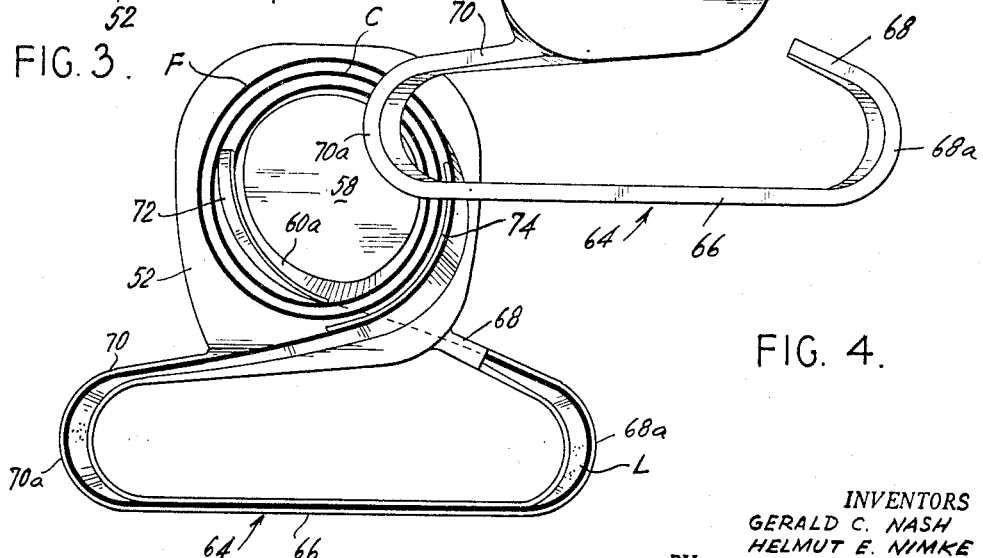

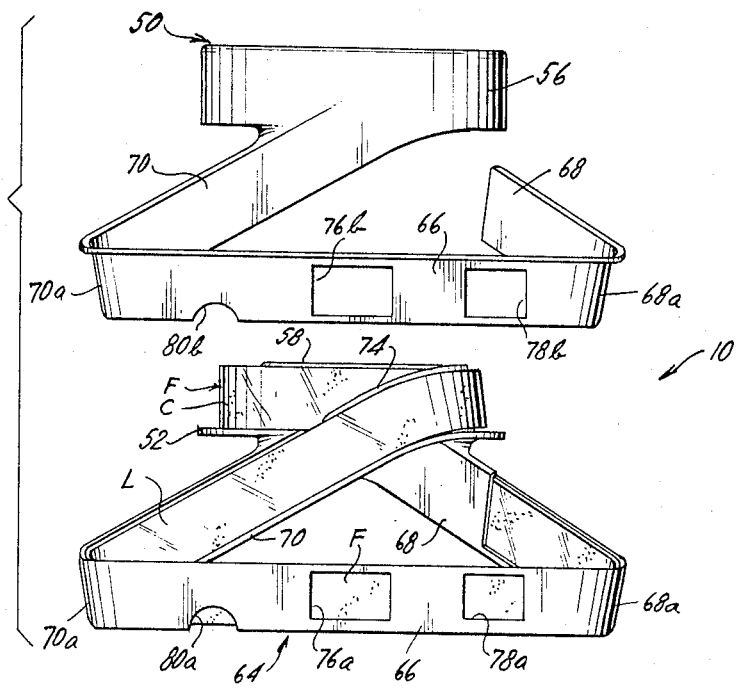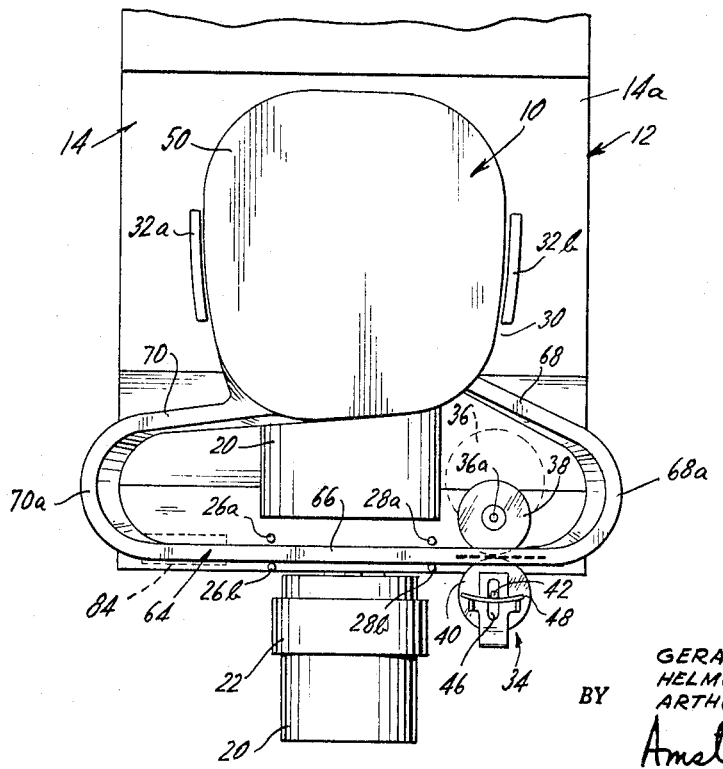

A. M. WAGNER ETAL 3,278,252

FILM STRIP PROJECTOR AND CASETTE

Filed Aug. 25, 1965

INVENTORS
GERALD C. NASH
HELMUT E. NIMKE
BY ARTHUR M. WAGNER

Ameter + Levy
ATTORNEYS

Oct. 11, 1966 A. M. WAGNER ETAL 3,278,252
FILM STRIP PROJECTOR AND CASETTE
Filed Aug. 25, 1965 5 Sheets-Sheet 4

INVENTORS
GERALD C. NASH
HELMUT E. NIMKE
BY ARTHUR M. WAGNER
Amster & Rothstein
ATTORNEYS Oct. 11, 1966    A. M. WAGNER ETAL    3,278,252
FILM STRIP PROJECTOR AND CASETTE
Filed Aug. 25, 1965    5 Sheets-Sheet 5

INVENTORS
GERALD C. NASH
HELMUT E. NIMKE
BY ARTHUR M. WAGNER

Amster & Rothstein
ATTORNEYS

United States Patent Office 3,278,252
Patented Oct. 11, 1966

3,278,252
FILM STRIP PROJECTOR AND CASETTE
Arthur M. Wagner, 150 West End Ave., New York, N.Y.;
Helmut E. Nimke, 2346 85th St., Brooklyn, N.Y.; and
Gerald C. Nash, 369 Melville Ave., Montreal, Quebec,
Canada
Filed Aug. 25, 1965, Ser. No. 486,261
19 Claims. (Cl. 352—72)

This is an continuation-in-part of application Serial No. 157,599 filed December 6, 1961, now abandoned, and entitled Film Strip Projector and Casette.

The present invention relates generally to apparatus for the continuous projection of an endless film strip, and in particular to a casette for the storage and projection of an endless film strip and to an improved projector for continuously and/or intermittently projecting such endless film strip.

Of recent times, considerable research has gone into developing new techniques for the visual presentation of educational, commercial and institutional media which will have a greater impact on the viewer. There has been developed a process for the continuous and integrated visual presentation of art and/or photographic media which involves a substantial departure from conventional visual aids and has the required impact to enable its widespread adoption as teaching and commercial aids. This process, which is identified by the trademark Scrollfilm employs a continuous film strip, of either 16 or 35 mm. stock, which is projected at a relatively slow rate (i.e. of the order of .4 to 1.0 ft. per minute for 16 mm.) such that the viewer or observer sees a continuously moving image in a framed area on the viewing screen, with or without accompanying sound. The visual effect is very much like that of a panoramic presentation of still art and may be coordinated in motif, pacing and overall layout. Exceptionally dramatic, unique and exciting effects may be obtained through the judicious selection and illustration of the visual material. Operating at the aforesaid projection or transport rates for 16 mm. film, a length of approximately 7.5 ft. provides for a screening time of approximately 15 minutes.

Working with this type of media, it becomes important to protect the continuous film strip from ambient environments to avoid damage during handling and to provide adequate storage. Further, it would be advantageous to provide for the projection of the film strip without the need of manual threading and for rewinding. These objectives should be achieved in an environment which facilitates the initial handling of the film and enables the film to be loaded into and fed through the projector with ease and without the need of complicated manual manipulations, adjustments and the like.

Broadly, it is an object of the present invention to provide an improved projector and casette for the storage and projection of a continuous film strip which realizes one or more of aforesaid objectives.

Specific features of the invention reside in the provision of a casette which affords protection for the film strip from the ambient environments and during handling and storage; establishes a directional and positional control of the film strip during its movement through the associated projector; functionally provides a framing aperture which is automatically oriented with respect to the optical system of the projector upon loading of the casette into the projector; enables direct drive of the film strip such that the same may be reversibly driven through the projector and continuously rewound in the casette; and facilitates the derivation of control signals from the film strip which may be employed for related functions, such as a simultaneous audio presentation.

In accordance with an illustrative embodiment demonstrating objects and features of the present invention there is provided a casette for the continuous projection of an endless film strip which is arranged in a coil having its inside and outside ends connected to each other to form a film loop. The casette comprises a film housing having an internal core adapted to have the coil supported thereon and a re-entrant film guide in communication with the housing and adapted to have the film loop pass therethrough as the endless film strip is continuously unwound from one end of the coil and wound up at the other end thereof. Means are provided along the film guide to establish a framing aperture for the continuous projection of said endless film strip as the latter is transported along the film guide and through the framing aperture after the casette is loaded into the asociated projector. Advantageously, internal buttressing is provided within the housing intermediate the core and the film guide which cooperates with the core and the film guide for preventing the collapse of the endless film strip during travel thereof between the coil and film guide, such that the endless film strip may be transported in either direction in response to direct drive imparted thereto at the drive opening.

As a feature of the invention, the projector which receives the casette includes an optical system having spaced lens assemblies arranged along an optical axis, with means defining a guide way extending between the lens assemblies in a projection plane which receives the film guide. Further, the projector includes a drive which is arranged to contact the endless film strip at the drive opening for establishing the reversible flow of the endless film strip from the housing through the film guide for the protection of successive portions of the film strip.

The above brief description, as well as further objects, features and advantages of the present invention will be more fully appreciated by references to the following detailed description of presently preferred, but nonetheless illustrative embodiments of a projector and casettes in accordance with the present invention, when taken in conjunction with the accompanying drawings, wherein:

FIG. 1 is a perspective view, with parts broken away and sectioned, of an improved casette embodying features of the present invention;

FIG. 2 is a fragmentary sectional view taken substantially along the line 2—2 of FIG. 1 and looking in the direction of the arrows;

FIG. 3 is a fragmentary sectional view taken substantially along the line 3—3 of FIG. 1 and looking in the direction of the arrows;

FIG. 4 is an exploded plan view showing the two component parts of a typical, but nonetheless illustrative, subassembly for the manufacture of the casette, with the continuous film strip being shown supported therein;

FIG. 5 is an exploded front elevational view of the two component parts of a typical casette in accordance with the present invention;

FIG. 6 is a plan view of the casette shown supported in an operative position in a projector embodying further features of the present invention;

Figure 7:
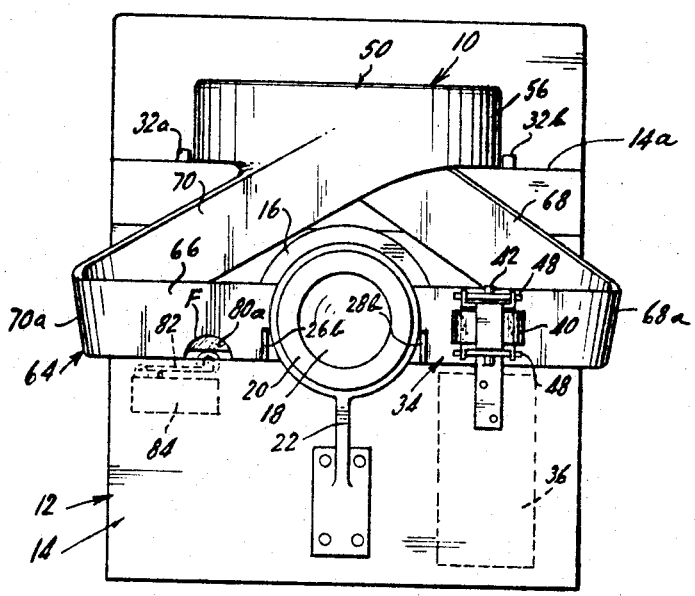
FIG. 7 is a front elevational view of the projector having the casette assembled therein.
Figure 8:
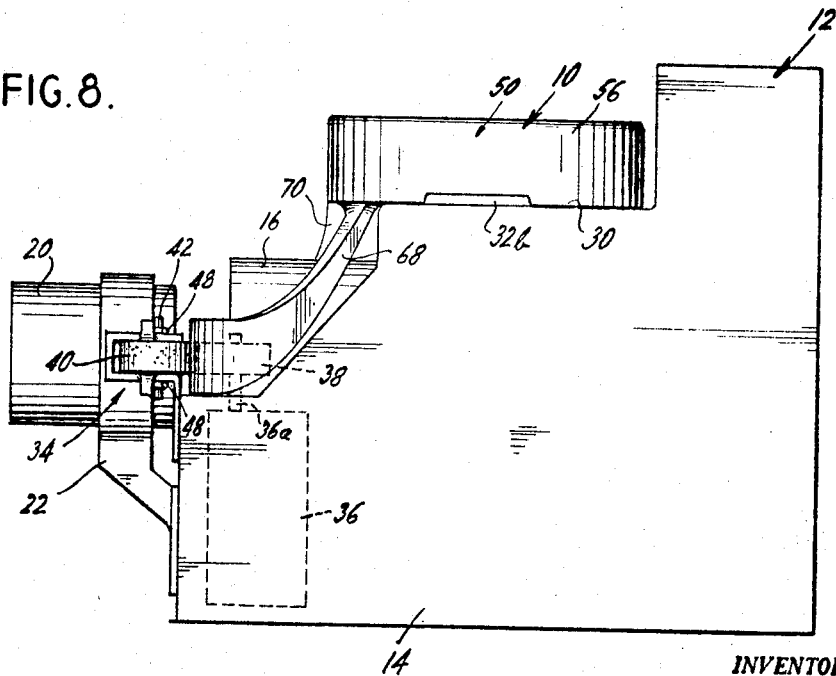
FIG. 8 is a side elevational view of the projector having the casette assembled therein.
Figure 9:
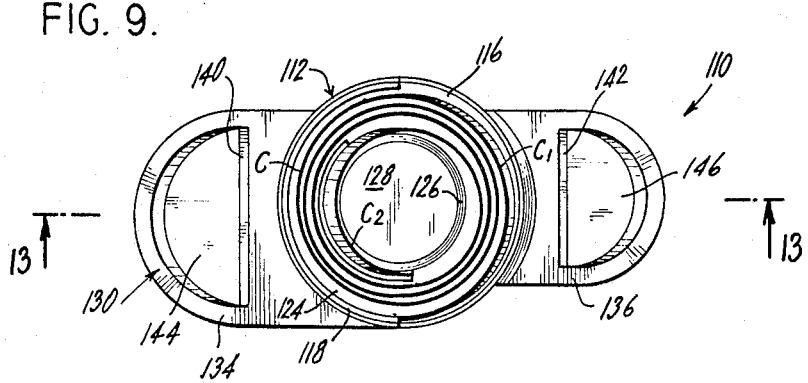
FIG. 9 is a plan view, with the cover removed, of a modified casette or cartridge embodying further features of the present invention.
Figure 10:
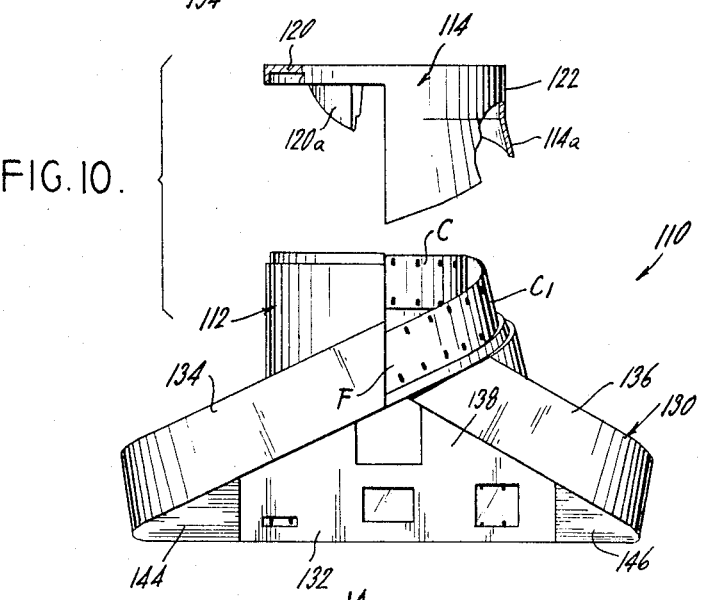
FIG. 10 is a rear elevational view of the casette shown in FIG. 9, with the cover removed and partially shown in section.
Figure 11:
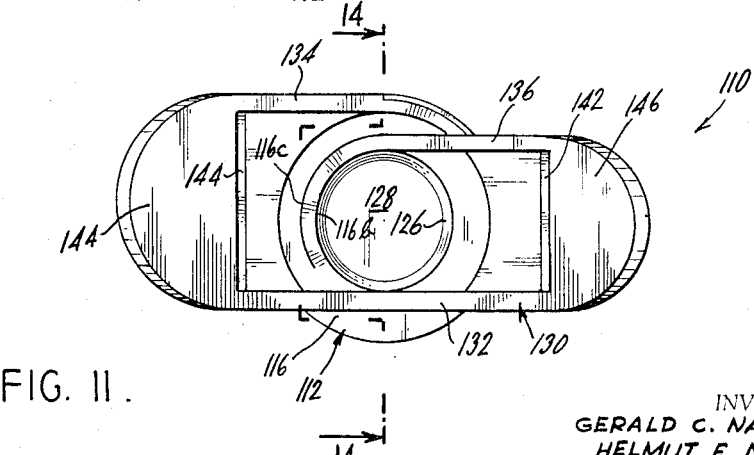
FIG. 11 is a bottom plan view of the casette shown in FIG. 9.
Figure 13:
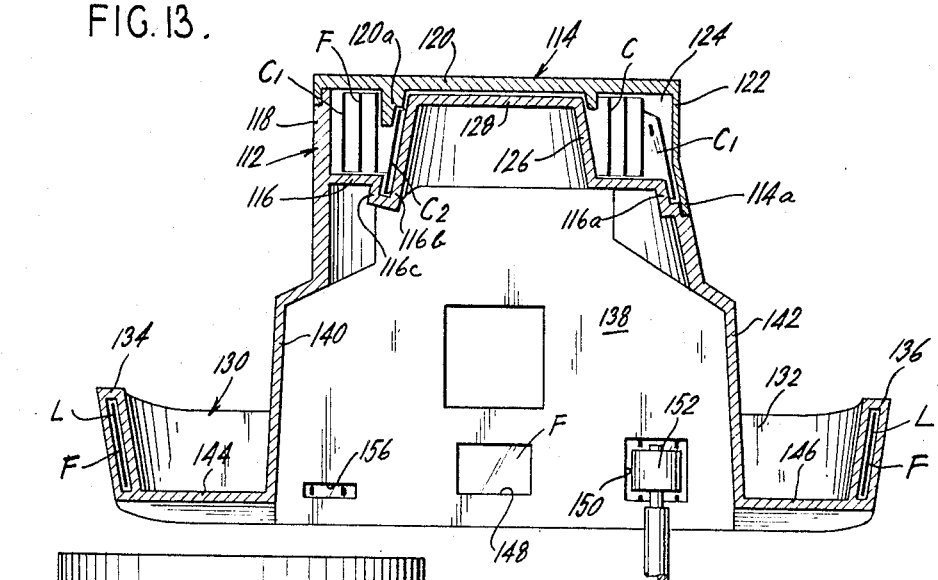
FIG. 13 is a sectional view, on an enlarged scale, taken substantially along the line 13—13 of FIG. 9 but with the cover in place; and, FIG. 14 is a sectional view taken substantially along the line 14—14 of FIG. 11.
Figure 12:
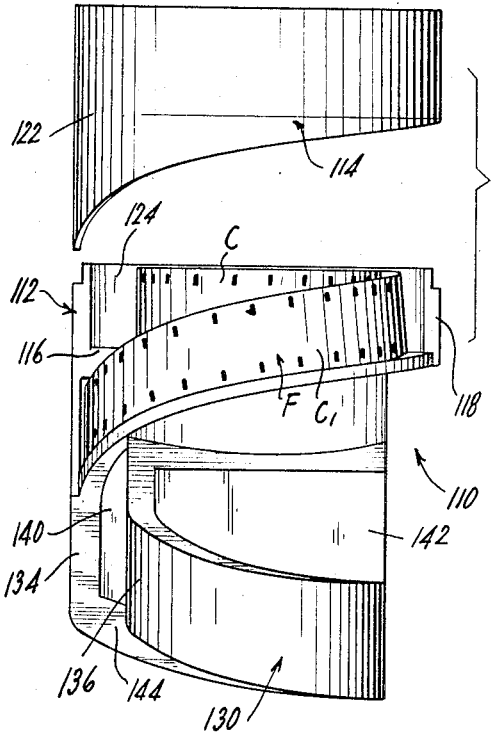
FIG. 12 is an elevational view taken from the right of FIG. 10, and on an enlarged scale, with the cover removed to expose the film.
Figure 14:
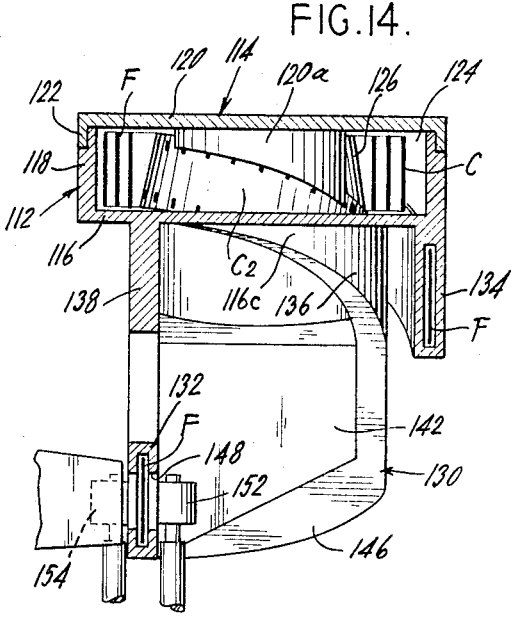

Referring now specifically to the drawings, there is shown in FIGS. 1 to 5 inclusive a typical casette demonstrating features of the present invention and generally designated by the reference numeral 10. In FIGS. 6 to 8 inclusive, the casette 10 is shown in mounted and operative relation to a projector 12 embodying further features of the present invention. The projector 12 is of exceptionally simple construction and includes a projector housing 12 which contains any suitable arrangement for projecting a light beam such as a projection lamp, a reflector arranged rearwardly of the projector lamp, and a lens assembly including a forward condenser, a heat-absorbing glass and a rearward condenser. The lens assembly (not shown) is arranged in a lens housing 16 along the beam or optical axis established by the projector lamp and associated lens. The beam-forming arrangement is completed by an objective lens assembly 18 (see FIG. 7) received within a further lens housing 20 aligned with and spaced forwardly of the lens housing 16 along the projection or optical axis. The housing 20 for the objective lens assembly 18 (which usually includes a series of three lens known as a Cooke's triplet) is adjustably supported on an appropriate mounting bracket 22 for focusing the image projected by the projector 12.

Provision is made in the transverse space between the rearward and forward lens housings 16, 20 to establish a guideway 24 which bridges or traverses the optical axis and extends generally in a projection plane at right angles to the optical axis. In this illustrative embodiment, the transverse guideway 24 is established by opposed pairs of locating pins 26a, 26b and 28a, 28b (see FIG. 6) which are arranged to define the opposite sides of the guideway 24 and are disposed at locations laterally offset to either side of the projection or optical axis established by the respective lens assemblies. It is within the contemplation of the present invention that other means will be employed for establishing a guideway in the projection plane along which the continuous film strip may move during projection thereof.

Further, the projection 12 is provided with a casette-receiving rack or seat, generally designated by the reference numeral 30, which is spaced above and rearwardly of the guideway 24 and is adapted to accommodate the housing or storage container of the casette 10, as will subsequently be described. In this illustrative embodiment, the casette-receiving rack 30 is defined by an upper wall section 14a of the projector housing 14 and spaced confronting upstanding ribs 32a, 32b disposed at opposite sides of and symmetrically to the vertical plane containing the optical or projection axis. It is within the scope of the present invention to provide other and substantially equivalent means for defining the casette-receiving rack or seat 30 and to change the shape of the rack to accommodate the modified casette or cartridge shown in FIGS. 9 to 14 inclusive.

Still further, the projector 14 is provided with a drive, generally designated by the reference numeral 34, which is disposed at a location laterally offset from the projection or optical axis and is adapted to contact the endless film strip in the projection plane established by the guideway 24 for reversibly transporting the endless strip through the projection system of the projector 14. In this illustrative embodiment, the drive 34 includes a gear head fractional horsepower direct current motor 36 which is of the reversible and variable speed type. The drive shaft 36a of the motor 36 extends vertically and carries a drive roller 38 which has its peripheral drive surface appropriately oriented to contact the film strip as it passes in the projection plane and tangentially thereto. Disposed at the opposite side of the film strip in the projection plane is a driven roller 40 which is carried on a vertically extending stub shaft 42 mounted on the roller-supporting bracket. The roller-supporting bracket 44 includes horizontally extending upper and lower arms which are provided with elongated slots (i.e. slot 46 in the upper arm which extends at right angles to the projection plane). The slots journal the stub shaft 42 such that the driven roller 40 may rotate in various adjusted positions towards and away from the projection plane. A leaf spring 48 is disposed contiguous to each end of the stub shaft 42 and arranged to urge the stub shaft 42 towards the projection plane such that the peripheral surface of the driven roller 40 will engage the film strip and urge the same against the peripheral driving surface of the driving roller 38 to provide the necessary reaction force to establish film transport. The rollers 38, 40 are fabricated of or faced with an appropriate elastomeric material to provide frictional engagement with the film strip, without marring the same. In this illustrative embodiment the roller 40 may be cammed away from the roller 38 upon contact with the adjacent portions of the casette 10 incident to the mounting of the casette in the projector 12. Alternatively, it is within the contemplation of the present invention to provide an arrangement wherein the rollers 38, 40 are manually moved into spaced relation and held therein by means which are manually actuated preliminary to the removal of the casette from the projector, and tripped or released to re-engage the film strip automatically upon re-insertion of a casette into the projector.

Preliminary to a detailed description of the casette 10, references will be made to the typical, but nonetheless illustrative configuration of the continuous film strip in this illustrative embodiment. As seen best in FIGS. 1 and 4, the film strip, generally designated by the letter F, includes a storage coil C having plural concentric turns which are in adjacent and substantially self-supporting relation with respect to each other. The inner and outer ends or turns of the coil C are physically withdrawn from the coil C and are interconnected to provide a film loop L which is successively replaced by different portions of the film strip from the coil C in response to film transport in either direction, as will be described. It will be appreciated that this type of endless configuration facilitates automatic and simultaneous rewind of the film strip F, regardless of the direction of the feeding or transporting movement imparted thereof. Payout of the film strip from either the inside or outside of the coil C (i.e. by pulling or pushing the loop L of the film strip F in either direction with reference to the fixed point) results in automatic pickup or rewind. In the illustrative configuration of the film strip F, the film loop L is turned or twisted inside out and consequently rotated 180° external to the dimensional confines of the coil C proper thereby resulting in a cross-over of the film strip between the coil proper and the film loop L. In some instances, such cross-over may not be desirable in that the resultant film path does not follow the natural curving tendency of the film strip which is introduced during the manufacture thereof. Accordingly, the film loop L need not be provided with the cross-over, and under such circumstances, will be reversed 180° with respect to the illustrated position, with reversal of the portion of the casette which receives the film loop L as described hereinafter.

The casette 10 comprises a substantially cylindrical housing 50 which includes a base or bottom wall 52, a top wall 54 spaced therefrom and parallel thereto, and an interconnecting upstanding cylindrical wall 56. Internally of the housing 50 there is provided a centrally disposed core or hub 58 having an upstanding film-supporting wall 60. The film-supporting wall 60 of hub 58 cooperates with the upstanding cylindrical wall 56 of the housing 50 to provide a toroidal storage chamber 62 which is adapted to receive the coil C of the film strip F. A reentrant film guide 64 is provided in communication with the housing 50 and is adapted to have the film loop L pass therethrough as the endless film strip F is continuously unwound from one end of the coil C and wound up at the other end thereof. The film guide 64 includes an elongated and substantially planar film-utilizing section 66 which is spaced from the storage chamber 62, and is connected thereto by a pair of film-feeding sections 68, 70 which connect the opposite ends of the film-utilizing section 66 to the housing 50. Specifically the film-feeding sections 68, 70 are disposed in upward and convergent relationship, with the film-feeding section 68 crossing beneath the film-feeding section 70 and being connected in communication with the toroidal storage chamber 62 contiguous to the inner periphery thereof (see FIG. 2) and with the feeding section 70 passing over the feeding section 68 and being connected to the toroidal storage chamber 62 contiguous to the outer periphery thereof (see FIG. 3). The divergent and lower ends of the respective feeding sections 68, 70 have curved terminal portions 68a, 70a which merge with the film-utilizing section 66.

The bounding walls of the film storage chamber 62, the bounding walls of the film guide 64 and further buttressing along the film path are arranged to support the endless film strip F against collapse to thereby establish a natural payout and take-up of the film strip from the coil C when the film strip F is driven in either direction. The endless curved film strip may be considered to be the equivalent of a curved column which is placed in compression in advance of the location of drive and in tension in trailing relation thereto such that the relatively flexible film strip has a tendency to buckle incident to being driven. The effect of the internal buttressing is to impart rigidity and support to the film strip F such that the film strip may be driven by the direct application of a linear push or pull thereto from the external drive 34. Considering for the purpose of illustration that the rollers 38, 40 will drive the continuous film strip F from right to left in the several illustrative views, the successive buttressing along the film path is as follows:

The inner end of the curved film loop L is supported by the adjacent convolutions of the coil C until such time as the film strip begins to pass downwardly along the film-feeding section 68. Throughout this region there is a tendency for the film strip F to skew inwardly, as seen best in FIGS. 1 and 2. Accordingly the adjacent segment 60a of the hub wall 60 is relieved away to accommodate the progressive inward skewing of the upper edge of the film strip relative to the lower edge of the film strip. Thus, the relieved-away segment 60a supports the inner surface of this unsupported length of the film strip. In order to provide support at the outer surface of the film strip along this unsupported length, there is provided an internal buttress 72 which is contoured and disposed in substantially spaced relation to the adjacent segment 60a of the film-supporting wall 60, as seen best in FIGS. 1, 2 and 4. The spacing between the walls 60a and 72 is such as to laterally confine the film strip F as it leaves its supported relation to the adjacent convolutions of the coil C and moves towards the entry end of the downwardly inclined feeding section 68. As the film strip S passes downwardly along the feeding section 68, the adjacent upstanding walls of the feeding section affords the necessary buttressing. In the region of the curved terminal portion 68A of the feeding section 68 where the film strip is curved into the projection plane established by the film-utilizing section 66, the spacing between and contour of the upstanding or lateral walls of the feeding section 68 is established to gradually turn the film strip such that it assumes a substantially horizontal course in a vertical orientation for passage through the film-utilizing section 66. The configuration of the walls of the curved section 68a is seen best in FIG. 4. As the film strip passes along the film-utilizing section 66, the bounding walls, which are in spaced parallel relationship with respect to each other, buttress the film strip, with a sufficient spacing to allow the smooth transport of the film in the projection plane and through the optical axis. Thereupon, the film enters the curved terminal portion 70a of the feeding section 70, and passes upwardly along the inclined film-feeding section 70, being appropriately buttressed by the adjacent upstanding walls of the feeding section, and emerges contiguous to the outer periphery of the storage chamber 62 at the crossing over with the adjacent convergent end of the feeding section 68. As the film strip leaves the support afforded by the walls of the feeding section 70, there is provided an internal butttress 74 which is in appropriate spaced relation to and configured with respect to the adjacent internal wall segment 56a of the housing wall 56 to buttress the film strip. As the film strip F enters the storage chamber 62, there will be a tendency for the same to skew outwardly and accordingly the segment 56a of the wall 56 is appropriately configured to support the outer surface of the film strip, while the buttress 74 is shaped to support the inner surface thereof, as may be appreciated by inspecting FIGS. 3 and 4. The buttressing 74 terminates at a location where the adjacent internal wall of the toroidal chamber 62 becomes substantially upstanding at which location the film strip again becomes convoluted and is thereby supported by adjacent turns of the coil C.

Medially of the film-utilizing section 66 of the film guide 64, the front and rear walls thereof are formed with aligned cut-outs 76a, 76b which provide a framing aperture along the optical or projection axis through which successive portions of the continuous film strip may be projected. In some instances, it may be feasible and desirable to manufacture the medial segment of the film-utilizing section 66 of a clear material, such as acrylic or styrene plastic which has suitable light-transmitting properties and to define the framing aperture by blocking out surrounding portions (i.e. by masking or painting). With this expedient, one possible source of contamination or damage to the film strip is eliminated. Although the framing aperture is shown as of a single size in this illustrative embodiment, it will be appreciated that by a number of different simple mechanical expedients, it is possible to alter the size of the framing aperture in accordance with the requirements of the user of the projector. For example, the cut-out 76a, 76b may be made for the maximum size of framing aperture and a blocking or masking element having a framing aperture of sufficient proportions and/or shape may be fitted over the framing aperture to alter the configuration of the projected image.

The upstanding or bounding walls of the film guide are provided with further cut-outs 78a, 78b to provide a drive opening laterally offset from the framing aperture and appropriately oriented and dimensioned to receive the respective rollers 38, 40 upon insertion of the film-utilizing section 66 in the guideway 64, as seen in FIGS. 6 to 8 inclusive.

Further, the film-utilizing section 66 is provided with suitable cut-outs or openings 80a, 80b at a location laterally offset from the framing apertures 76a, 76b at which control signals may be derived from the endless film strip F for coordinated control functions, such as the provision of a predetermined sequence of audio material from a magnetic recording tape or the like or frame by frame or intermittent projection of film images. For example, in copending application, application Serial No. 169,254 filed January 29 ,1962, and entitled Visual and Audio Presentation System (now U.S. Patent No. 3,181,421 of May 4, 1965) and assigned to the assignee of the present application, there is disclosed a visual and audio presentation system which incorporates a continuous film projector in which the film strip provides a control signal, for example by the expedient of notching the edge of the film, or slotting the film in its face, adhering electrically conductive segments to the film, or the like. To this end, the projector 12 may be provided with a sensing element 82, associated with appropriate circuitry 84 for coordination into such system. For a detailed description of a typical visual and audio presentation system which may be coordinated with the instant casette 10 and projector 12, reference may be made to the detailed description in said copending application. However, it will be appreciated that the addition of this signal sensing feature is optional and may only be required where intermittent projection or where a coordinated audio-visual presentation is desired, with interrelated operations of the projector and a means for providing audio material, such as a tape recorder or the like.

In this illustrative embodiment, and as seen best in FIGS. 3 and 4, the casette 10 is formed of at least two sub-assemblies, as of molded plastic material, which may be inter-engaged to provide a complete perimetrical press and a "snap-lock" seam joint between the two component parts. It is preferable that the joint be designed so that any attempt to reopen the casette will result in the destruction thereof, or at least the rendering of the casette inoperative. This will preclude tampering with the casette and the incident contamination of the film strip. However, in certain applications it may be desirable to facilitate the easy opening of the casette, and in these instances, the several parts of the casette may be releasably secured together by screws or the like such that the user may gain access to the film for replacement, editing, etc.

In this illustrative subassembly for the casette 10, it is necessary to splice the inner and outer ends of the coil together after at least making a partial assembly thereof into one of the casette parts (i.e. the lower part as shown in FIGS. 4 and 5). However, it will also be appreciated that the subdivision of the component parts of the casette 10 may be arranged to facilitate the loading of the film strip F after splicing thereof and while in a closed or continuous configuration.

Referring now specifically to FIGS. 9 to 14 inclusive, there is shown a modified casette or cartridge, generally designated by the reference numeral 110, which includes a multi-section housing, and a removable cover 114. The housing 112 includes a base or bottom wall 116 (see FIGS. 12 to inclusive) and an upstanding outer wall 118 which is the form of a 180° arcuate segment. The removable cover 114 includes a top wall 120 which is adapted to extend in spaced parallel relation to the base wall 116 and a depending outer wall 122 which is the form of a 180° arcuate segment and is adapted to cooperate with the upstanding outer wall 118 to complete the outer periphery of a toroidal film-storage chamber 124 within the housing 114. Internally of the housing 114, there is provided a centrally disposed frusto-conical core or hub 126 which is bridged by a top wall 128. As described in connection with the previous embodiment, the toroidal chamber 124 receives the coil C of the film strip F.

A reentrant film guide, generally designated by the reference numeral 130, is provided in communication with the housing 112 and is adapted to have the film loop pass therethrough as the endless film strip F is continuously unwound and rewound. The reentrant film guide 130 includes an elongated substantially planar film-utilizing section 132 which is spaced from the storage chamber 124 and is connected thereto by a pair of downwardly diverging film-feeding sections 134, 136. The film-utilizing section 132 extends in a vertical projection plane which is spaced below the film storage chamber 124, with the projection plane being laterally offset from the axis of the stored coil C of film. The film-feeding sections 134, 136 extend in upward and convergent relationship relative to each other, with the diverging ends being respectively connected to the opposite ends of the film-utilizing section 132. The converging ends of sections 134, 136 cross over and communicate with the toroidal chamber 125 contiguous to the inner and outer peripheries or margins thereof and in position to receive and return the film F to the coiled configuration. As seen best in FIG. 11, the film-feeding section 134 is arranged to merge and communicate with the toroidal chamber 124 contiguous to the outer periphery thereof, while the film-feeding section 136 is of a somewhat narrower width and arranged to merge and communicate with the chamber 124 contiguous to the inner periphery or margin thereof. Thus the film-feeding sections 134, 136 are configurated to withdraw and return film along a natural feed path from the outer and inner convolutions $C_1$, $C_2$ of the coil C, or vice versa, depending upon the direction of reversible transport of the film through the film-utilizing section 132. The curvatures of the respective film-feeding sections and the manner in which the divergent ends merge into the film-utilizing section 132 is selected such that no abrupt change is imparted to the film as it is transported through the reentrant guide 130 and returned to the storage chamber 144 thereby avoiding undue stressing of the film and materially contributing toward the smooth flow of the film through the casette or cartridge 110. In the illustrative construction, the reentrant film guide 130 is supported in depending relation from the housing 112 by a substantially vertically extending front mounting wall 138, side mounting walls 140, 142 and oppositely directed bottom mounting walls 144, 146. In the actual molding of the cartridge, the front mounting wall 138 includes two superposed wall sections which define the opposite sides of the film-utilizing section 132. The cartridge 110 is split for convenience in molding substantially, as illustrated in the exploded showing of FIG. 5.

The bounding walls of the film-storage chamber 124, the bounding walls of the film guide 130 and further buttressing along the film path cooperate with each other to support the endless film strip F against collapse to thereby establish a natural pay-out and take-up of the film strip from the coil when the film strip F is driven in either direction. Considering the feed of the film from the outermost convolution $C_1$ of the coil C, the film first passes into the adjacent entry end of the film-feeding section 134. As seen best in FIGS. 10 and 13, as the film leaves the outer convolution $C_1$, it is immediately engaged within upstanding buttressing walls 116a, 114a formed integrally with the housing wall 116, 114. The buttressing 116a, 114a is at an appropriate angle to guide the film which is somewhat skewed at the entry end of the film-feeding section 134. As the film passes through the film-feeding section 134, the opposite bounding walls thereof afford the necessary support against collapse or buckling, as seen best in FIGS. 12 to 14 inclusive. At the location where the divergent end of the film-feeding section 134 merges with the film-utilizing section 132, the film is gradually turned into the vertical projection plane. After the film passes through the film-utilizing section 132, it enters the adjacent divergent lower end of the other film-feeding section 136 whereupon the film passes upwardly, crosses beneath the film-feeding section 134 and is introduced into the toroidal chamber 124 contiguous to the inner periphery or margin thereof and at the innermost convolution $C_2$. Here again, additional buttressing 116b, 116c is afforded by the hub 126 and the bottom wall 116 of the housing. Additional buttressing is afforded by an appropriately configurated depending flange 120a formed on the top wall 120 of the cover 114 at a circumferential location to cooperate with the frusto-conical hub 126. Thus, for all practical intents and purposes, the film is continuously buttressed from the time it leaves the coil until it is returned thereto. The configuration and length of the loop L is such as to make feasible and exceptionally small cartridge and requires correspondingly less buttressing along its length to assure film transport without buckling. In turn, the relatively short film path materially reduces resistance during traverse and thereby causes less film wear. The symmetry of the cartridge and of the film-feeding guides renders the same particularly suitable for reversible transport, thus facilitating programming of the film strip in a manner where it is practical to provide multiple programs on the film strip or readily return to a given film sequence without the necessity of going through the entire endless strip.

Medially of the film-utilizing section 132, there is formed a framing aperture 148 which is provided by appropriate aligned cutouts in the corresponding front and rear walls of the section 132. The framing aperture 148 is along an optical projection path which is perpendicular to the projection plane and is free from obstruction by the film housing 112 and the film guide 130. To one side of the framing aperture 148, there is provided a drive opening 150 which is again afforded by corresponding aligned cutouts in the front and rear walls of the film-utilizing section 132 which permits access to the film F of appropriate drive rollers 152, 154. Although the entire projector which is specifically suited for this casette configuration is not illustrated in FIGS. 9 to 14 inclusive, it will be appreciated that the projector shown in FIGS. 6 to 8 inclusive is suitable for use with the modified casette with but minor modification of the projector housing. At the opposite side of the framing aperture 148, the film-utilizing section 132 is provided with a control opening 156 which serves as a means for deriving signals for use in accordance with U.S. Patent No. 3,181,421.

From the foregoing it will be appreciated that the present casettes provide for the protection of the film strip from ambient environment, and during handling and storage; establishes directional and positional control of the film strip during transport; enables the transport of the film strip in either direction to provide a reversible film storage and presentation system; and automatically establishes a framing aperture and appropriate drive window for the projection and drive of the film strip when assembled in the projector. The assembly and interchange of casettes in the projector requires a rather simple manual manipulation and eliminates the need of cumbersome threading and incident handling of the film strip.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What we claim is:

1. A casette for the continuous projection of an endless film strip arranged in a coil and having inside and outside turns interconnected by a film loop comprising a film housing having an internal core adapted to have said coil supported thereon, a reentrant film guide in communication with said housing and adapted to have said film loop pass therethrough as said endless film strip is continuously unwound and rewound, said reentrant film guide having entry and exit ends disposed relative to said core of said film housing to receive said endless film strip as it is continuously unwound from one turn of said coil and wound up at the other turn thereof, internal buttressing extending from said entry and exit ends respectively and merging into said reentrant film guide, said reentrant film guide having walls cooperating with said internal buttressing to continuously support said film strip during transport thereof through said film guide and past said drive opening and framing aperture, means along said film guide providing a drive opening through which said film loop may be engaged for transporting said endless film strip through said film guide, and means along said film guide providing a framing aperture for continuous projection of said endless film strip as the latter is transported along said film guide and through said framing aperture.

2. A casette for the continuous projection of an endless film strip arranged in a coil and having inside and outside turns and an interconnecting film loop comprising a film housing having an internal core adapted to have said coil supported thereon, a reentrant film guide in communication with said housing and adapted to have said film loop pass therethrough as said endless film strip is continuously unwound from and rewound on said coil, means along said film guide providing a framing aperture extending in a projection plane for continuous projection of said endless film strip as the latter is transported along said film guide and through said framing aperture, an optical projection path perpendicular to said projection plane at said framing aperture being free from obstruction by said film housing and said film guide, and internal buttressing within said housing intermediate said core and said film guide for preventing collapse of said endless film strip during travel thereof between said coil and said film guide such that said endless film strip may be transported in either direction.

3. A casette for the continuous projection of an endless film strip arranged in a coil and having inside and outside turns and an interconnecting film loop comprising a film housing having an internal core adapted to have said coil supported thereon, a reentrant film guide in communication with said housing and adapted to have said film loop pass therethrough as said endless film strip is continuously unwound from and rewound on said coil, means along said film guide providing a drive opening through which said film loop may be engaged for transporting said endless film strip through said film guide, means along said film guide providing a framing aperture extending in a projection plane for continuous projection of said endless film strip as the latter is transported along said film guide and through said framing aperture, an optical projection path perpendicular to said projection plane at said framing aperture being free from obstruction by said film housing and said film guide, and internal buttressing within said housing intermediate said core and said film guide for preventing collapse of said endless film strip during travel thereof between said coil and said film guide such that said endless film strip may be transported in either direction in response to drive imparted thereto at said drive opening.

4. A casette for the continuous projection of an endless film strip arranged in a coil and having inside and outside coils interconnected by a film loop comprising a film housing having an internal core adapted to have said coil supported thereon, a reentrant film guide in communication with said housing and adapted to have said film loop pass therethrough as said endless film strip is continuously unwound and rewound, means along said film guide providing a drive opening through which said film loop may be engaged for transporting said endless film strip through said film guide, means along said film guide providing a framing aperture extending in a projection plane for continuous projection of said endless film strip as the latter is transported along said film guide and through said framing aperture, an optical projection path perpendicular to said projection plane at said framing aperture being free from obstruction by said film housing and said film guide, means along said film guide providing a sensing location for monitoring said endless film strip to obtain control signals related to the projection of prescribed segments of said endless film strip, and internal buttressing within said housing intermediate said core and said film guide for preventing collapse of said endless film strip during travel thereof between said coil such that said film strip may be transported in either direction in response to drive imparted thereto at said drive opening.

5. A casette for the storage and projection of an endless film strip including a coil having plural concentric turns with the inner and outer turns thereof interconnected to provide a film loop comprising a housing having an internal core, said housing and core cooperating to provide a substantially toroidal storage chamber adapted to receive said coil, a film guide including an elongated and substantially planar film-utilizing section spaced from said storage chamber and a pair of diverging film-feeding sections connecting the opposite ends of said film-utilizing section to said housing, an optical projection path perpendicular to said film-utilizing section being free from obstruction by said film housing and said film-feeding sections of said film guide, said film-feeding sections respectively being in communication with said storage chamber such that said endless film strip may be reversibly transported along a film path from the inner turn of said coil to said film guide and to the outer turn of said coil, and means including the bounding walls of said film guide and internal buttressing along said film path extending from said film-feeding sections into said storage chamber and terminating contiguous to said core for supporting said endless film strip against collapse after said film strip is removed from said core for reversible transport through said film guide.

6. A casette for the storage and projection of an endless film strip including a coil having plural concentric turns with the inner and outer turns thereof interconnected by a film loop comprising a housing having an internal centrally disposed core, said housing and core cooperating to provide a toroidal storage chamber adapted to receive said coil, a film guide including an elongated and substantially planar film-utilizing section spaced from said storage chamber and a pair of converging film-feeding sections connecting the opposite ends of said film-utilizing section to said housing, said film-feeding sections respectively being in communication with said storage chamber contiguous to the inner and outer peripheries thereof such that said endless film strip may be reversibly transported along a film path from the inner turn of said coil to said film guide and to the outer turn of said coil, the bounding walls of said film-utilizing section being provided with a framing aperture extending in a projection plane through which said endless film strip may be projected, an optical projection path perpendicular to said projection plane at said framing aperture being free from obstruction by said film housing and said film guide, the bounding walls of said film-utilizing section being further provided with a drive opening through which said endless film strip may be engaged for the reversible transport thereof from said coil to said film loop.

7. A casette for the storage and projection of an endless film strip including a coil having plural concentric turns with the inner and outer turns thereof interconnected by a film loop comprising a substantially cylindrical housing having an internal centrally disposed core, said housing and core cooperating to provide a toroidal storage chamber adapted to receive said coil, a film guide including an elongated and substantially planar film-utilizing section spaced from said storage chamber and a pair of film-feeding sections connecting the opposite ends of said film-utilizing section to said housing, said film-feeding sections respectively being in communication with said storage chamber contiguous to the inner and outer peripheries thereof such that said endless film strip may be reversibly transported along a film path from the inner turn of said coil to said film guide and to the outer turn of said coil, means including the bounding walls of said storage chamber, the bounding walls of said film guide and internal buttressing along said film path extending from said film-feeding sections into said storage chamber and terminating contiguous to said core for supporting said endless film strip against collapse after said film strip is removed from said core for reversible transport through said film guide, the bounding walls of said film-utilizing section being provided with a framing aperture substantially medially thereof through which said endless film strip may be projected, an optical projection path perpendicular to said projection plane at said framing aperture being free from obstruction by said film housing and said film guide, the bounding walls of said film-utilizing section being further provided with a drive opening through which said endless film strip may be engaged for the reversible transport thereof from said coil to said film loop.

8. A casette for the continuous projection of an endless film strip arranged in a coil and having inside and outside turns interconnected by a film loop comprising a film housing having internal support means adapted to have said coil supported thereon to turn about a coil axis, a reentrant film guide in communication with said housing and adapted to have said film loop pass therethrough as said endless film strip is continuously unwound and rewound, said film guide including a pair of diverging film-feeding sections having adjacent entry and exit ends arranged relative to said internal support means to receive and return said film loop to said coil and a film-utilizing section connecting the opposite and divergent ends of said film-feeding sections, said film-utilizing section being disposed at a location offset in two directions from said internal support means and in a plane parallel to said coil axis, means along said film-utilizing section of said film guide providing a drive opening through which said film loop may be engaged for transporting said endless film strip through said film guide, means along said film-utilizing section of said film guide providing a framing aperture for continuous projection of said endless film strip as the latter is transported along said film guide and through said framing aperture, and internal buttressing within said housing between said internal support means and the entry and exit ends of said film guide for preventing collapse of said endless film strip during travel thereof between said coil and said film guide such that said film strip may be transported in either direction in response to drive imparted thereto at said drive opening.

9. The combination with a projector including an optical system for the continuous projection of an endless film strip when transported in a projection plane substantially at right angles to the axis of said optical system, and means defining a cassette-receiving rack on said projector, of a casette for the storage and projection of said endless film strip which is arranged to include a coil having plural concentric turns and with the inner and outer turns thereof interconnected by a film loop, said casette comprising a housing removably mounted in said rack and having an internal core, said housing and core cooperating to provide a toroidal storage chamber adapted to receive said coil, a film guide including an elongated and substantially planar film-utilizing section spaced from said storage chamber and having a framing aperture disposed substantially in said projection plane, the axis of said optical system being perpendicular to said projection plane at said framing aperture and being free from obstruction by said housing and said film guide, said film guide further including a pair of film-feeding sections connecting the opposite ends of said film-utilizing section to said housing, said film-feeding sections respectively being in communication with said storage chamber such that said endless film strip may be reversibly transported along a film path, and means including the bounding walls of said storage chamber, the bounding walls of said film guide, and internal buttressing along said film path for supporting said endless film strip against collapse.

10. The combination with a projector including an optical system for the continuous projection of an endless film strip when transported in a projection plane substantiallly at right angles to the axis of said optical system, a drive arranged substantially in said projection plane at a location laterally offset from said axis and adapted to contact said endless film strip, and means defining a casette-receiving rack on said projector, of a casette for the storage and projection of said endless film strip which is arranged to include a coil having plural concentric turns and with the inner and outer turns thereof interconnected by a film loop, said casette comprising a substantially cylindrical housing removably mounted in said rack and having an internal centrally disposed core, said housing and core cooperating to provide a toroidal storage chamber adapted to receive said coil, a film guide including an elongated and substantially planar film-utilizing section spaced from said storage chamber and having disposed substantially in said projection plane, the axis of said optical system being perpendicular to said projection plane at said framing aperture and being free from obstruction by said housing and said film guide, said film guide further including a pair of film-feeding sections connecting the opposite ends of said film-utilizing section to said housing, said film-feeding sections respectively being in communication wtih said storage chamber such that said endless film strip may be reversibly transported along a film path, means including the bounding walls of said storage chamber, the bounding walls of said film guide and internal buttressing along said film path for supporting said endless film strip against collapse, the bounding walls of said film-utilizing section being provided with a framing aperture substantially medially thereof through which said endless film strip may be projected, the bounding walls of said film-utilizing section being further provided with a drive opening laterally offset from said framing aperture through which said endless film strip is engaged by said drive for the reversible transport thereof from said coil to said film loop.

11. The combination with a projector including an optical system for the continuous projection of an endless film strip when transported in a projection plane substantially at right angles to the axis of said optical system, a drive arranged substantially in said projection plane at a location offset from said axis and adapted to contact said endless film strip, and means defining a casette-receiving rack on said projector, of a casette for the storage and projection of said endless film strip which is arranged to include a coil having plural concentric turns and with the inner and outer turns thereof interconnected by a film loop, said casette comprising a substantially cylindrical housing removably mounted in said rack and having an internal centrally disposed core, said housing and core cooperating to provide a toroidal storage chamber adapted to receive said coil, a film guide including an elongated and substantially planar film-utilizing section spaced from said storage chamber and having a framing aperture disposed substantially in said projection plane, the axis of said optical system being perpendicular to said projection plane at said framing aperture and being free from obstruction by said housing and said film guide, said film guide further including a pair of film-feeding sections connecting the opposite ends of said film-utilizing section to said housing, said film-feeding section respectively being in communication with said storage chamber contiguous to the inner and outer peripheries thereof such that said endless film strip may be reversibly transported along a film path from the inner end of said coil to said film guide and to the outer end of said coil, the bounding walls of said film-utilizing section being provided with a framing aperture medially thereof through which said endless film strip may be projected, the bounding walls of said film-utilizing section being provided with a drive opening laterally offset from said framing aperture through which said endless film strip is engaged by said drive for the reversible transport thereof from said coil to said film loop, the bounding walls of said film utilizing section being further provided with a control aperture through which control signals may be derived from said endless film strip.

12. The combination with a projector including an optical system for the continuous projection of an endless film strip when transported in a projection plane substantially at right angles to the axis of said optical system, said optical system including spaced lens assemblies arranged along an optical axis, means defining a guideway extending between said lens assemblies in said projection plane, a drive including a pair of roller arranged to contact said endless film strip substantially in said projection plane at a location laterally offset from said axis and adapted to contact said endless film strip, and means defining a seat on said projector spaced rearwardly of and above said guideway, of a casette for the storage and projection of said endless film strip which is arranged to include a coil having plural concentric turns and with the inner and outer turns thereof interconnected by a film loop, said casette comprising a substantially cylindrical housing removably mounted in said seat and having an internal centrally disposed core, said housing and core cooperating to provide a toroidal storage chamber adapted to receive said coil, a film guide including an elongated and substantially planar film-utilizing section spaced from said storage chamber and having a framing aperture disposed substantially in said guideway and in said projection plane, the axis of said optical system being perpendicular to said projection plane at said framing aperture and being free from obstruction by said housing and said film guide, said film guide further including a pair of upwardly and rearwardly inclined convergent film-feeding sections connecting the opposite ends of said film-utilizing section to said housing, said film-feeding sections respectively being in communication with said storage chamber contiguous to the inner and outer peripheries thereof such that said endless film strip may be reversibly transported along a film path from the inner end of said coil to said film guide and to the outer end of said coil, and means including the bounding walls of said storage chamber, the bounding walls of said film guide, and internal buttressing along said film path for supporting said endless film strip against collapse.

13. The combination with a projector including an optical system for the continuous projection of an endless film strip when transported in a projection plane substantially at right angles to the axis of said optical system, said optical system including spaced lens assemblies arranged along an optical axis, means defining a guideway extending between said lens assemblies in said projection plane, a drive including pair of rollers arranged to contact said projection plane at a location laterally offset from said axis and adapted to contact said endless film strip, and means defining a seat on said projector spaced rearwardly of and above said guideway, of a casette for the storage and projection of said film strip which is arranged to include a coil having plural concentric turns and with the inner and outer turns thereof interconnected by a film loop, said casette comprising a substantially cylindrical housing removably mounted in said seat and having an internal centrally disposed core, said housing and core cooperating to provide a toroidal storage chamber adapted to receive said coil, a film guide including an elongated and substantially planar film-utilizing section spaced from said storage chamber and disposed substantially in said guideway and in said projection plane, said film guide further including a pair of upwardly and rearwardly inclined convergent film-feeding sections connecting the opposite ends of said film-utilizing section to said housing, said film-feeding sections respectively being in communication with said storage chamber contiguous to the inner and outer peripheries thereof such that said endless film strip may be reversibly transported along a film path from the inner end of said coil to said film guide and to the outer end of said coil, and means including the bounding walls of said storage chamber, the bounding walls of said film guide, and internal buttressing along said film path for supporting said endless film strip against collapse, the bounding walls of said film-utilizing section being provided with a framing aperture medially thereof through which said endless film strip may be projected.

14. The combination with a projector including an optical system for the continuous projection of an endless film strip when transported in a projection plane substantially at right angles to the axis of said optical system, said optical system including spaced lens assemblies arranged along an optical axis, means defining a guideway extending between said lens assemblies in said projection plane, a drive including a pair of rollers arranged to contact said endless film strip substantially in said projection plane at a location laterally offset from said axis and adapted to contact said endless film strip, and means defining a seat on said projector spaced rearwardly of and above said guideway, of a casette for the storage and projection of said endless film strip which is arranged to include a coil having plural concentric turns and with the inner and outer turns thereof interconected by a film loop, said casette comprising a substantially cylindrical housing removably mounted in said seat and having an internal centrally disposed core, said housing and core cooperating to provide a toroidal storage chamber adapted to receive said coil, a film guide including an elongated and substantially planar film-utilizing section spaced from said storage chamber and disposed substantially in said guideway and in said projection plane, said film guide further including a pair of upwardly and rearwardly inclined convergent film-feeding sections connecting the opposite ends of said film-utilizing section to said housing, said film-feeding sections respectively being in communication with said storage chamber contiguous to the inner and outer peripheries thereof such that said endless film strip may be reversibly transported along a film path from the inner end of said coil to said film guide and to the outer end of said coil, and means including the bounding walls of said storage chamber, the bounding walls of said film guide, and internal buttressing along said film path for supporting said endless film strip against collapse, the bounding walls of said film-utilizing section being provided with a framing aperture medially thereof through which said endless film strip may be projected, the bounding walls of said film-utilizing section being further provided with a drive opening laterally offset from said framing aperture through which said endless film strip is engaged by said drive for the reversible transport thereof from said coil to said film loop.

15. A casette for the continuous projection of an endless film strip arranged in a coil and having inside and outside turns and an interconnecting film loop comprising a film housing having an internal support adapted to have said coil supported thereon, a reentrant film guide in communication with said housing and adapted to have said film loop pass therethrough as said endless film strip is continuously unwound from and rewound from said coil, said film guide including diverging film-feeding sections communicating at their adjacent ends with said housing and having a film-utilizing section extending between the divergent ends of said film-feeding sections and in a projection plane for continuous projection of said endless film strip as the latter is transported along and through said film guide, an optical projection path perpendicular to said projection plane at said film-utilizing section being free from obstruction by said film housing and said film-feeding sections of said film guide, and internal buttressing within said housing intermediate said core and said film guide for preventing collapse of said endless film strip during travel thereof between said coil and said film guide such that said endless film strip may be transported in either direction.

16. A casette for the continuous projection of an endless film strip arranged in a coil and having inside and outside turns interconnected by a film loop comprising a film housing having internal support means adapted to have said coil supported thereon to turn about a coil axis, a reentrant film guide in communication with said housing and adapted to have said film loop pass therethrough as said endless film strip is continuously unwound and rewound, said film guide including a pair of diverging film-feeding sections having adjacent entry and exit ends arranged relative to said internal support means to receive and return said film loop to said coil and a film-utilizing section connecting the opposite and divergent ends of said film-feeding sections, said film-utilizing section being disposed at a location offset in two directions from said internal support means and in a plane parallel to said coil axis and means along said film-utilizing section of said film guide providing a framing aperture for continuous projection of said endless film strip as the latter is transported along said film guide and through said framing aperture.

17. A projector comprising an optical system for the continuous projection of an endless film strip when transported in a projection plane substantially at right angles to the axis of said optical system, said optical system including spaced lens assemblies arranged along an optical axis, means defining a guideway extending between said lens assemblies in said projection plane, a drive including a pair of rollers arranged to contact said endless film strip substantially in said projection plane at a location laterally offset from said axis and adapted to contact said endless film strip, and means defining a seat on said projector spaced rearwardly of and above said guideway.

18. A casette for the continuous projection of an endless film strip arranged in a coil and having inside and outside turns and an interconnecting film loop comprising a film housing including an internal toroidal chamber having inner and outer peripheries adapted to have said coil supported therein and a reentrant film guide having opposite ends in communication with said chamber contiguous to its inner and outer peripheries respectively and adapted to have said film loop pass therethrough as said endless film strip is continuously unwound from and rewound from said coil, said film guide including a film-utilizing section removed from said chamber, an optical projection path perpendicular to said projection plane at said film-utilizing section being free from obstruction by said film housing and the remainder of said film guide.

19. A casette for the continuous projection of an endless film strip arranged in a coil and having inside and outside turns and an interconnecting film loop comprising a film housing including an internal toroidal chamber having inner and outer peripheries adapted to have said coil supported therein, a reentrant film guide having opposite ends in communication with said chamber contiguous to its inner and outer peripheries respectively and adapted to have said film loop pass therethrough as said endless film strip is continuously unwound from and rewound from said coil, said film guide including a film-utilizing section removed from said chamber, means along said film-utilizing section providing a drive opening through which said film loop may be engaged for transporting said endless film strip through said film-utilizing section of said film guide and means along said film-utilizing section providing a framing aperture in a projection plane for continuous projection of said endless film strip as the latter is transported along said film guide and through said framing aperture, an optical projection path perpendicular to said projection plane at said framing aperture of said film-utilizing section being free from obstruction by said film housing and the remainder of said film guide.

References Cited by the Examiner
UNITED STATES PATENTS

| 2,853,923 | 9/1958 | Daniel | 352—31 |
| 3,176,310 | 3/1965 | Finnerty | 352—29 |

JULIA E. COINER, *Primary Examiner.*